US008270915B2

(12) United States Patent
Sanford et al.

(10) Patent No.: US 8,270,915 B2
(45) Date of Patent: Sep. 18, 2012

(54) ANTENNA AND BUTTON ASSEMBLY FOR WIRELESS DEVICES

(75) Inventors: Emery A. Sanford, San Francisco, CA (US); Zhijun Zhang, Santa Clara, CA (US); Evans Hankey, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1258 days.

(21) Appl. No.: 11/651,094

(22) Filed: Jan. 6, 2007

(65) Prior Publication Data

US 2008/0166004 A1 Jul. 10, 2008

(51) Int. Cl.
*H04B 1/38* (2006.01)

(52) U.S. Cl. ....... 455/90.3; 455/90.2; 343/904; 381/375

(58) Field of Classification Search ................. 455/90.2, 455/90.3; 343/904; 381/375

See application file for complete search history.

(56) References Cited

U.S. PATENT DOCUMENTS

| | | | | |
|---|---|---|---|---|
| 2,931,115 | A * | 4/1960 | Pester et al. | 353/116 |
| 5,440,315 | A | 8/1995 | Wright et al. | |
| 5,657,969 | A | 8/1997 | Bivens | |
| 5,710,987 | A * | 1/1998 | Paulick | 455/575.7 |
| 5,748,150 | A | 5/1998 | Rudisill | |
| 6,046,699 | A | 4/2000 | Elliott et al. | |
| 6,097,339 | A | 8/2000 | Filipovic et al. | |
| 6,099,482 | A * | 8/2000 | Brune et al. | 600/549 |
| 6,266,017 | B1 | 7/2001 | Aldous | |
| 6,509,876 | B1 | 1/2003 | Jones et al. | |
| 6,545,642 | B1 * | 4/2003 | Doub et al. | 343/702 |
| 6,545,643 | B1 | 4/2003 | Sward et al. | |
| 6,859,179 | B2 | 2/2005 | Chang | |
| 6,995,716 | B2 | 2/2006 | Hwang et al. | |
| 7,023,387 | B2 | 4/2006 | Wen et al. | |
| 7,639,187 | B2 | 12/2009 | Caballero et al. | |
| 2002/0163472 | A1 | 11/2002 | Kasuya et al. | |
| 2003/0157972 | A1 * | 8/2003 | Bae | 455/568 |
| 2003/0210199 | A1 | 11/2003 | Sward et al. | |
| 2004/0203488 | A1 * | 10/2004 | Sullivan et al. | 455/90.1 |
| 2005/0243015 | A1 | 11/2005 | Kfoury et al. | |
| 2007/0109204 | A1 * | 5/2007 | Phillips et al. | 343/702 |

FOREIGN PATENT DOCUMENTS

| | | |
|---|---|---|
| WO | WO 99/41801 | 8/1999 |
| WO | WO 02/087011 | 10/2002 |

* cited by examiner

*Primary Examiner* — Lana N Le
*Assistant Examiner* — Hsin-Chun Liao
(74) *Attorney, Agent, or Firm* — Treyz Law Group; G. Victor Treyz; David C. Kellogg

(57) ABSTRACT

An antenna and button assembly is provided for a compact portable wireless device such as a wireless headset for a handheld electronic device. An antenna structure is mounted within a button structure. The button structure includes a switch actuation member that extends past the antenna structure and into engagement with a switch. The switch actuation member may reciprocate within the button structure. A user may press upon an exposed end of the switch actuation member to operate the switch. The switch may be used to control the application of power to the compact portable wireless device or to perform other suitable functions. The button structure may be formed using dielectric materials such as plastic. By forming the button structure from dielectric, clearance is provided between the antenna structure and conductive portions of the compact portable wireless device so that the antenna of the compact wireless device operates properly.

16 Claims, 9 Drawing Sheets

ANTENNA AND BUTTON ASSEMBLY FOR WIRELESS DEVICES

BACKGROUND

This invention relates generally to wireless communications devices, and more particularly, to antenna and button structures for wireless communications devices.

As integrated circuit technology advances, it is becoming feasible to construct portable wireless devices with small form factors. Examples of portable wireless devices include mobile telephones, wireless headsets, digital cameras with wireless capabilities, remote controls, wristwatch-type devices, music players with wireless functions, and handheld computers. Devices such as these are often small enough to be held in the hand and may sometimes be referred to as handheld electronic devices. Larger portable wireless devices include laptop computers.

Portable electronic devices sometimes use antennas to transmit and receive radio-frequency signals. For example, wireless Bluetooth headsets have antennas for communicating with cellular telephones.

For proper antenna operation, an antenna resonating element in a portable wireless device is generally placed at a suitable distance from the conductive structures in the device. Sometimes antennas are mounted externally. This type of arrangement is used, for example, in certain cellular telephone whip antenna arrangements. When a more compact arrangement is needed, an antenna resonating element may be mounted on a printed circuit board in a device. However, to ensure satisfactory performance, it is generally necessary to locate the resonating element on a special portion of the circuit board that has been maintained free of electrical components. If sufficient clearance is not provided for the antenna resonating element in this way, the antenna may fail to operate properly.

In some situations, it is not acceptable to use an external antenna design. Constraints such as a desire for compactness, light weight, and good esthetics can make external designs inappropriate. Similarly, antenna arrangements based on circuit boards in which a large clearance is provided between an antenna resonating element and components mounted on the board may be unsatisfactory because too much board real estate is dedicated to providing the clearance.

It would therefore be desirable to be able to provide improved compact antenna configurations for wireless communications devices.

SUMMARY

In accordance with the present invention, wireless communications devices are provided. For example, a compact portable wireless device such as a wireless headset may be provided. The compact portable wireless device may have a button. The button may be formed substantially from dielectric such as plastic. An antenna may be formed by mounting an antenna resonating element on part of the button. Because the button is formed from dielectric, the button does not interfere with the proper operation of the antenna and helps to provide suitable clearance between the antenna resonating element and conductive structures in the compact portable wireless device.

With one suitable arrangement, the button contains a switch such as a dome switch. The switch may be operated by pressing against the switch with a switch actuation member. The button may have a button guide structure. The button guide structure may have a guide channel. The guide channel may be provided in the form of a hole through the button guide structure. The switch actuation member may have a stem that is supported and guided by the guide channel. When pressed by a user, the switch actuation member moves along the guide channel towards the switch. Raised structures such as ribs may be used to ensure that the switch actuation member reciprocates smoothly within the guide channel.

The wireless device may have a metal housing portion and a dielectric housing portion. The button may be formed within the dielectric housing portion, so that the performance of the antenna is not degraded.

The antenna resonating element may be formed from a flex circuit containing a strip of conductor. The flex circuit may be attached to the button guide structure using adhesive. The flex circuit may contain registration holes that mate with corresponding registration bosses. One or more of the bosses may serve as heat stake bosses and may be heat treated to help secure the flex circuit to the button guide structure.

Further features of the invention, its nature and various advantages will be more apparent from the accompanying drawings and the following detailed description of the preferred embodiments.

DETAILED DESCRIPTION

The present invention may apply to any suitable type of compact portable wireless device. Compact portable wireless devices that may be used with the antenna and button arrangements of the invention include cellular telephones, remote controls, global positioning system devices, music players, portable computers, wrist devices, pendant devices, headphone and earpiece devices, other wearable and miniature devices, and hybrid devices that include the functionality of two or more of these devices. With one particularly suitable arrangement, which is described herein as an example, the compact portable wireless device is a wireless headset. It is desirable for wireless headsets to be compact and lightweight and to be free of unsightly protrusions.

Figure 1:
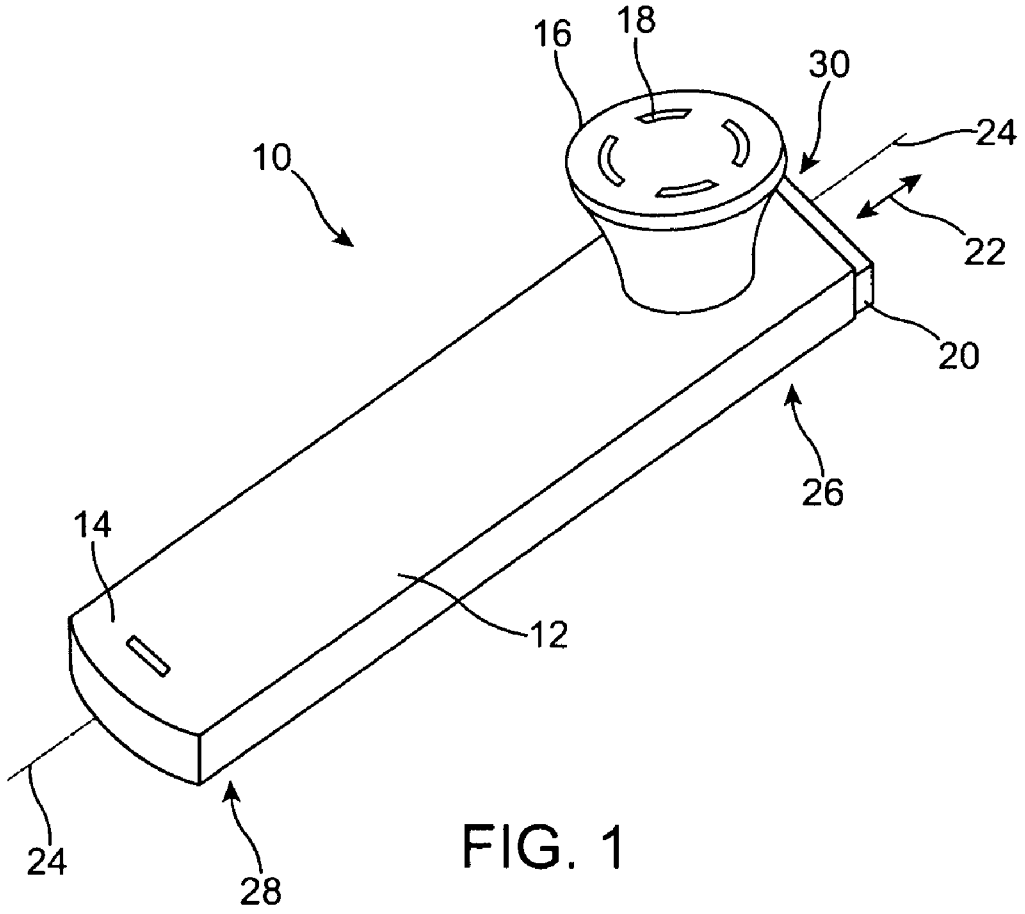
FIG. 1 is a schematic diagram of an illustrative compact portable wireless device in accordance with an embodiment of the present invention.

An illustrative wireless headset is shown in FIG. 1. Headset device 10 may have a elongated housing 12. For esthetic reasons and for durability, most of housing 12 may be formed of metal or other conductive materials (as an example). Device 10 may use an antenna to communicate wirelessly with external equipment. The antenna may be enclosed in housing 12 in region 26. To avoid interference with the antenna, the portion of housing 12 in region 26 may be constructed from plastic or other suitable dielectric.

The external equipment with which device 10 may communicate includes personal computers, portable computers, cellular telephones, music players, cellular telephones with music player functionality, other handheld electronic devices, and other suitable equipment. As an example, headset device 10 may be a Bluetooth® headset that communicates over a 2.4 GHz communications band with a handheld electronic device having voice communications capabilities. An illustrative Bluetooth headset arrangement of the type that may be used for device 10 is described in concurrently-filed commonly-assigned U.S. patent application No. 60/879,177, entitled "Wireless Headset,", which is hereby incorporated by reference herein in its entirety.

During use of device 10, earbud 16 is placed in a user's ear. In this position, end 28 of device 10 extends downward, towards the user's mouth. Sound (e.g., from a telephone call) may be presented to the user through slots 18 of earbud 16. At end 28 of device 10, device 10 has a microphone that resides within housing 12. Opening 14 in housing 12 allows sound to be conveyed to the microphone.

A button such as button 30 may be located at end 26 of device 10. Switch actuation member 20 reciprocates in directions 22 along longitudinal axis 24 of device 10 (i.e., in and out of end 26 of device 10). Switch actuation member 20 and other suitable portions of device 10 in the vicinity of end 26 may be formed of plastic or other suitable dielectric materials. For example, button 30 may contain a structure that guides switch actuation member 20 along axis 24. This button guide structure may be formed of plastic or other suitable dielectric.

An antenna resonating element may be mounted to the button guide structure or other suitable dielectric portions of device 10 in the vicinity of button 30 and end 26. Because the materials used to form button 30 and device 10 at end 26 are dielectrics, radio-frequency signals may be readily received by the antenna and transmitted by the antenna without interference button components.

Figure 2:
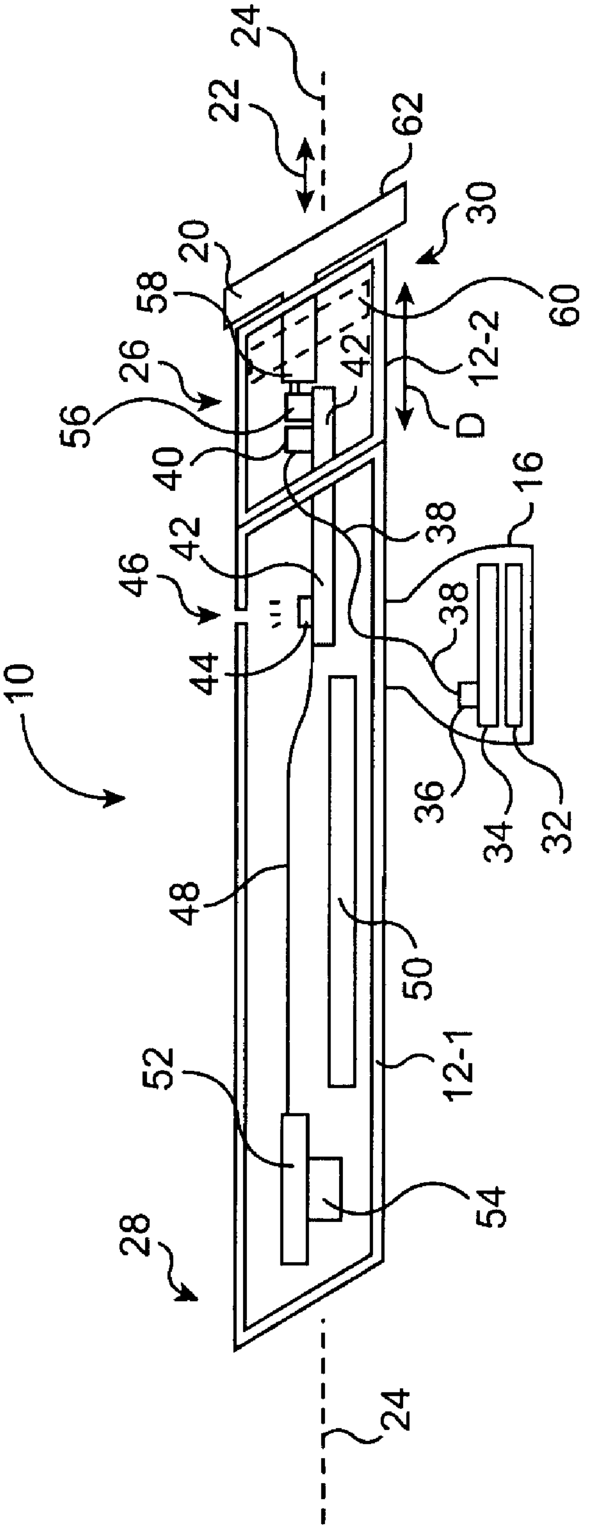
FIG. 2 is a cross-sectional side view of an illustrative compact portable wireless device using an antenna and button assembly in accordance with an embodiment of the present invention.

A cross-sectional side view of device 10 is shown in FIG. 2. Microphone 54 may be mounted to a printed circuit board such as printed circuit board 52 or other suitable mounting structures. Circuit components for processing microphone signals may be mounted on board 52. A signal path such as flex circuit cable 48 may be used to convey signals between microphone board 52 and circuit board 42. Electrical components may be mounted to circuit board 42 (e.g., battery protection circuits, control circuits, etc.).

One or more light emitting diodes (LEDs) such as LED 44 may be mounted in housing 12 for use as indicators. In the illustrative arrangement of FIG. 2, LED 44 has been mounted on printed circuit board 42 below hole 42 in housing 12. This allows light to escape from the housing 12 for viewing by a user.

Housing 12 (FIG. 1) may be formed from first portion 12-1 and second portion 12-2. First portion 12-1 may be formed of aluminum, stainless steel, magnesium, titanium, other suitable metals, alloys of these metals, and other suitable conductive materials. First housing portion 12-1 may also be formed partly or entirely from dielectric. Second portion 12-2 may be formed from dielectric materials such as plastic. With one suitable arrangement, no significant amounts of conductor are present at end 26 of device 10 to prevent interference with the antenna of device 10.

A connector such as coaxial cable connector 40 may be mounted to printed circuit board 42. Coaxial cable 38 may be connected to printed circuit board 34 using miniature coaxial cable connector 36.

Printed circuit board 34 may contain electronic components such as radio-frequency transceiver circuits. The radio-frequency transceiver circuitry of device 10 may support wireless communications over any suitable communications bands. Examples of communications bands that device 10 may support include the Bluetooth band at 2.4 GHz, the WiFi® communications bands, the wireless USB band, etc. With one suitable arrangement, which is described herein as an example, transceiver circuitry 34 supports Bluetooth communications between device 10 and an associated handheld electronic device (e.g., a cellular telephone handset or a hybrid cellular telephone and music player device).

Speaker 32 may be used to generate sound for the user of device 10. For example, when the user is using device 10 to conduct a telephone call, speaker 32 may be used to present audio from the telephone call. When device 10 is used as a music player, speaker 32 may be used to play music for the user. A source of power such as battery 50 may be used to power device 10.

A switch such as switch 56 may be mounted to circuit board 42. Switch actuation member 20 reciprocates in directions 22 along axis 24. When a user desires to perform a function associated with button 30, the user may press button outer surface 62. Button outer surface 62 may be pressed to force end 58 of switch actuation member 20 against switch 56. Depending on the type of switch being used (e.g., normally open, normally closed, etc.) pressing against switch 56 causes switch 56 to open or close. Electrical signals from switch 56 may be passed to circuitry on boards such as boards 52, 42, and 34. The control circuitry on these boards may process the switch signals and take appropriate action. Examples of actions that may be taken in device 10 when switch 56 is operated include turning device 10 on or off, resetting device 10, changing the mode of operation of device 10, etc. The control circuitry of device 10 may take actions based on single presses of button 30 or multiple presses of button 30. For example, a particular action may be taken when three rapid button presses are detected within a predetermined time interval.

A guide structure is provided in housing portion 12-2. The guide structure helps to support and guide switch actuation member 20. Any suitable mechanical arrangement may be used to support and guide switch actuation member 20 in button 30. With one suitable arrangement, which is described herein as an example, the guide structure includes portions that define a guide channel. Switch actuation member 20 has a stem that reciprocates along the channel. The channel may have elevated ribs or other raised portions that help to reduce friction between the sidewalls of switch actuation member 20 and the surfaces of the guide channel as the guide structure supports and guides switch actuation member 20.

The antenna of device 10 has a ground (sometimes referred to as a ground plane). The ground may be formed from any suitable conductive structures in device 10. For example, the antenna ground may be formed from conductive housing portion 12-1, layers of conductor on printed circuit boards such as board 42, combinations of such conductive structures, etc. The antenna of device 10 also has an antenna resonating element 60. Antenna resonating element 60, which is sometimes referred to as the antenna of device 10, may be mounted to the guide structure or other suitable structure associated with button 30. Because the structures that make up button 30 are primarily or entirely formed of dielectric, the antenna may function properly without interference from metal components in device 10 (e.g., circuit components on board 42) and without interference from the metal or other conductors that may be used in forming housing portion 12-1.

Antenna resonating element 60 is spaced away from housing portion 12-1 and the electrical components of device 10 such as the components on board 42 by distance D. Distance D can be selected to ensure that the spacing between the electrical components and housing materials of device 10 and antenna resonating element 60 are sufficient for satisfactory antenna performance. The distance D may be, for example, about 3-10 mm. Larger distances D offer greater clearance between the antenna resonating element and the electrical components of device 10, but require use of a housing portion such as portion 12-2 that is more elongated along axial dimension 24.

Because antenna resonating element 60 is mounted within the portion of device 10 that is being used by button 30, it is not necessary to increase the size of device 10 to accommodate antenna spacing D. No space is wasted, because antenna resonating element 60 is mounted to dielectric structures that are already being provided to support the operation of button 30. Button 30 therefore serves at least two functions. First, button 30 uses switch 56 to provide a control mechanism for device 10. Second, button 30, by serving as a support structure for antenna resonating element 60, creates clearance between antenna resonating element 60 and conductive housing portion 12-1 and/or other conductive structures in device 10 such as electrical components on board 42. Because the structures of button 30 serve as both button structures and as antenna support structure, button 30 and antenna resonating element 60 are sometimes collectively referred to as a button and antenna assembly, as a button structure or assembly, as an antenna structure or assembly, as a button, as an antenna, etc.

Figure 3:
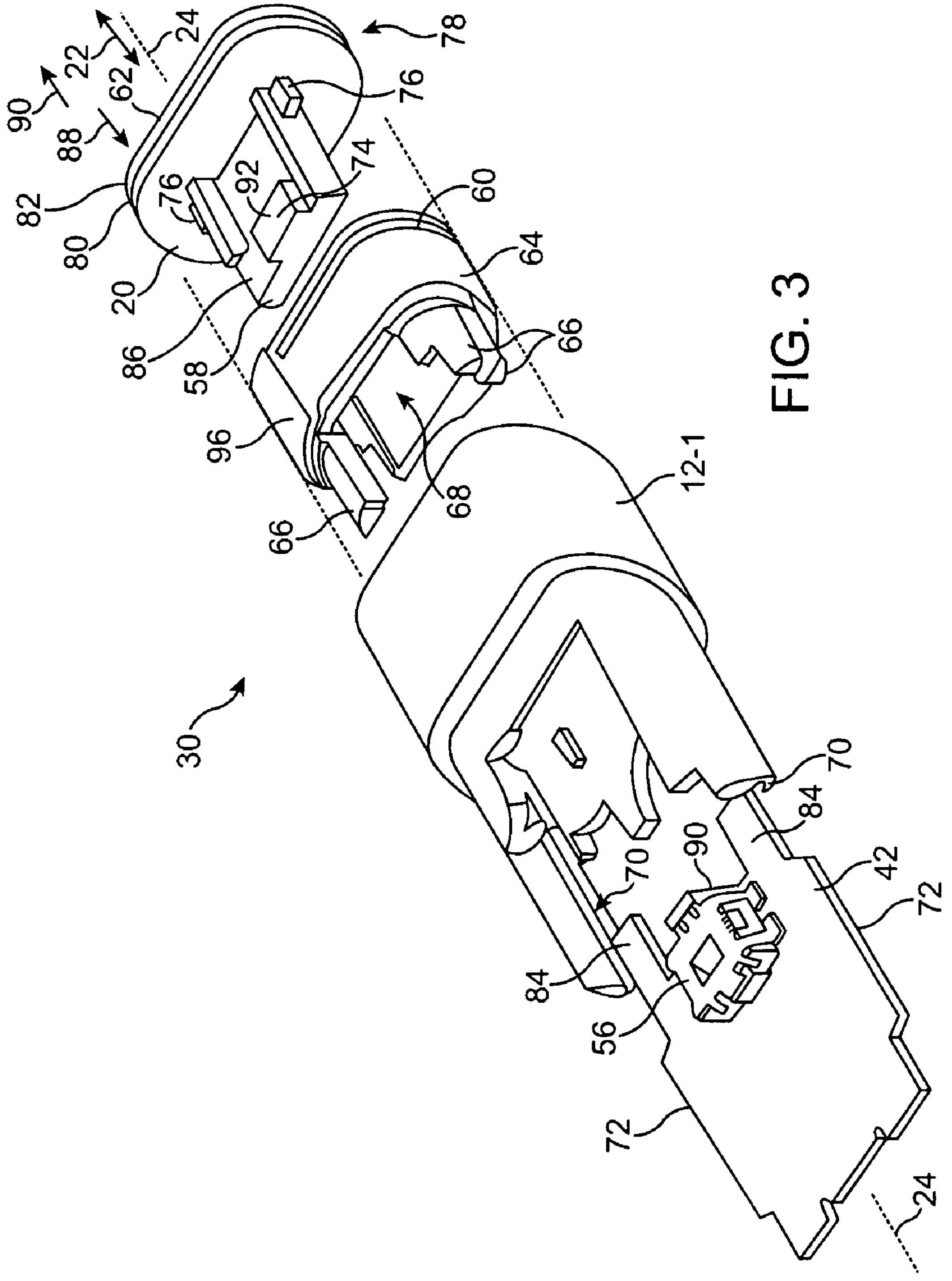
FIG. 3 is an exploded perspective view of an antenna and button assembly in accordance with an embodiment of the present invention.

An exploded perspective view of an illustrative embodiment of button 30 is shown in FIG. 3. As shown in the example of FIG. 3, button 30 may have switch actuation member 20, button guide structure 64, switch 56 mounted on a printed circuit board such as board 42, and a button housing.

The button housing for button 30 may be formed from device housing portion 12-1. This allows device 10 to retain an esthetically pleasing appearance. For example, the surfaces of button housing 12-1 and housing portion 12-1 may have similar colors and textures, so that it is not apparent to a user of device 10 that two separate housing portions are in use. Rather, to the user, it can appear as if device 10 is formed of a single unitary housing.

Circuit board 42 and button 30 may be attached to each other. With one suitable approach, housing portion 12-1 has guiding grooves 70. During assembly of button 30, edges 72 of circuit board 42 may slide into grooves 70. Cyanoacrylate glue or other suitable adhesives may be used to secure circuit board edges 72 to grooves 70. Other adhesives (e.g., ultraviolet-light cured epoxy) may be placed on printed circuit board surfaces 84, to help secure board 42 in button 30.

Button guide structure 64 has members 66 that receive surfaces 84 of board 42 and help to hold board 42 in place within button 30. Button guide structure 64 may be formed from a non-opaque material such as clear polycarbonate. This ensures that ultraviolet light that is applied to button 30 during manufacturing can reach ultraviolet-curing adhesives that have been applied to surfaces such as surfaces 84.

Button guide structure 64 may have a guide channel 68 that receives stem 86 of switch actuation member 20. During operation, switch actuation member 20 reciprocates back and forth along longitudinal axis 24 in directions 22. As switch actuation member 20 reciprocates, stem 86 reciprocates in channel 68. Gussets 76 on switch actuation member 20 provide structural support for stem 86. Button guide structure 64 may have recesses that accommodate gussets 76 when switch actuation member 20 is pressed fully inward in direction 88.

Ribs may be formed along the inner surfaces of channel 68 to help provide a low-friction guide path for stem 86. When pressed inward in direction 88, end 58 of switch actuation member 20 may press against surface 90 of switch 56 or other suitable switch actuation surface. This closes or opens a circuit between a pair of contacts within switch 56 or otherwise operates the switch 56 so that suitable actions may be taken by the control circuitry of device 10.

Switch 56 may be a side-actuated dome switch or any other suitable type of switch. In a side actuated dome switch, a rocker resides within the housing of the switch. As end 58 of switch actuation member 20 presses sideways in direction 88 against the rocker, the rocker bears against the switch housing and translates this sideways motion into vertical motion towards the surface of board 42. A dome switch may be mounted directly beneath the rocker, so downward motion of the rocker presses against the dome switch and causes switch contacts that are associated with the dome switch to become shorted together (or opened). Control circuitry in device 10 may sense the closing (or opening) of switch 56.

In addition to guiding stem 86, button guide structure 64 may serve as a support structure for antenna resonating element 60. Antenna resonating element 60 may be formed from a conductive strip or any other suitable antenna structure. A typical conductive strip may be about 0.6 mm in width and may have a length that is appropriate for handling the frequencies in the communications band of interest for device 10. Conductive strips may be formed of metal or other suitable conductors and may be straight, serpentine, curved, or any other suitable shape. Illustrative metals that may be used for resonating element 60 include copper, silver, gold, and brass. If desired, other metals or alloys of these metals may be used to form antenna resonating element 90. If the metal or other conductor that is used to form antenna resonating element 90 has a tendency to oxidize upon exposure to air, encapsulant may be used to ensure that the antenna resonating element 90 is hermetically sealed.

Switch actuation member 20 may have a latch portion 74. During assembly, latch portion 74 is forced past a matching portion of button guide structure 64. Once past the matching portion of button guide structure 64, switch actuation member 20 and latch portion 74 snap into place. When switch actuation member 20 is withdrawn in direction 90, surface 92 of latch 74 catches on button guide structure 64, thereby preventing switch actuation member 20 from being removed from button 30.

Switch actuation member 20 may have button head portion 78. During operation, a user may use a finger to press against surface 62 of button portion 78. Portion 78 may be formed from a single material or multiple materials. The illustrative arrangement of FIG. 3 shows how button portion 78 may be formed from two different plastic portions 80 and 82 using a double shot process. Outer plastic portion 82 may be formed from clear polycarbonate to add gloss to the exposed button surface. Portion 80 may be formed from a plastic based on acrylonitrile-butadiene-styrene copolymers (sometimes referred to as ABS plastic). ABS plastic flows well during molding operations and is suitable for forming small parts.

Button guide structure 64 may be formed of polycarbonate (e.g., clear polycarbonate that permits ultraviolet light to reach ultraviolet-cured adhesive on surfaces 84). Stem 86, which reciprocates within channel 68 of guide structure 64, may be formed as a unitary part with portion 80. By forming stem 86 from ABS plastic, potentially squeaky polycarbonate-to-polycarbonate surface contact between stem 86 and channel 68 of guide structure 64 is avoided.

Housing portion 12-1, which serves as the enclosure for button 30, may be formed from a blend of polycarbonate and ABS plastic. This type of blend provides device 10 with an attractive appearance. The ABS portion of the blend may help housing portion 12-1 from becoming too brittle.

Although shown as being formed from three separate plastic structures in FIG. 3, button 30 may be formed from any suitable dielectrics. Some conductive materials (e.g., portions of switch 56) are associated with button 30, but these materials are insignificant when compared to the overall size and shape of the dielectric portions of button 30. Moreover, switch 56 is located away from antenna resonating element 60 to ensure sufficient clearance around antenna resonating element 60.

Antenna resonating element 60 may be formed from a strip of metal that is affixed to button guide structure 64 using adhesive or other suitable attachment mechanisms. With one particularly suitable arrangement, resonating element 60 may be formed from a strip of conductor that is part of a flex circuit. Flex circuits, which are sometimes referred to as flexible printed circuit boards, may be formed from polyimide and other flexible substrates. Copper strips or other suitable conductive strips may be pattered on the flex circuit substrate to form antenna resonating element 60. During assembly, the flex circuit that contains antenna resonating element 60 may be mounted to button guide structure 64.

Figure 4:
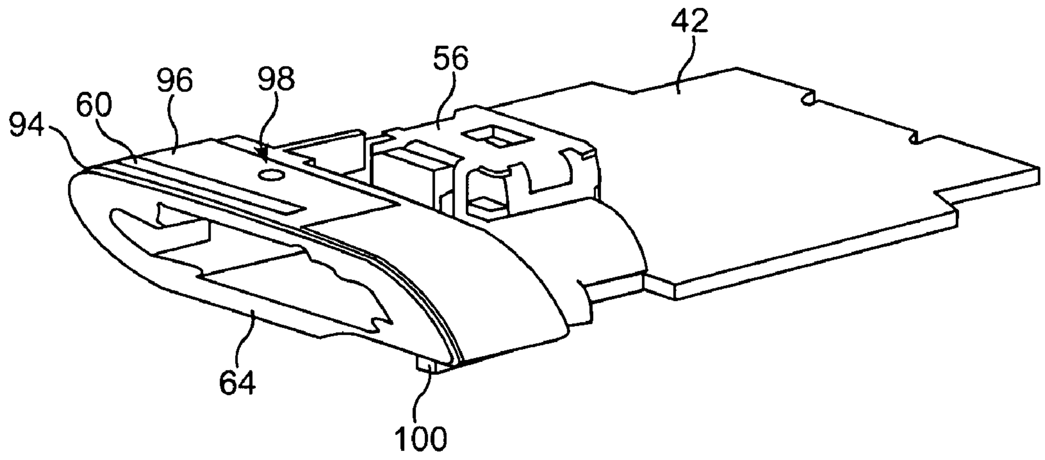
FIG. 4 is a perspective view of an antenna and button assembly in which a circuit board has been mounted to a button guide and antenna support structure in accordance with an embodiment of the present invention.

If desired, the flex circuit or other suitable structure used for forming antenna resonating element 60 may be attached to an inner surface of button guide structure 64 (e.g., along the inner surface of channel 68). As shown in FIG. 4, another suitable technique involves attaching antenna resonating element 60 to outer surface 94 of button guide structure 64 by wrapping flex circuit 96 and embedded antenna resonating element 60 around button guide structure 64. Arrangements in which flex circuit 96 is attached to an exposed outer surface of button guide structure 64 are generally considered to be easier to manufacture than arrangements in which flex circuit 96 or another antenna structure is mounted within button guide support 64. Configurations in which antenna resonating element 60 is mounted to the exterior of button guide structure 64 are therefore described herein as an example.

Flex circuit 96 may contain registration features such as hole 98 and other suitable registration structures. When flex circuit 96 is wrapped around button guide structure 64, the registration features may engage associated registration structures on button guide structure 64 such as boss 100. This helps to ensure proper alignment of flex circuit 96 and antenna resonating element 60 relative to button guide structure 64. Bosses such as boss 100 may serve both as registration structures and as heat stake structures that are used to attach flex circuit 96 to button guide structure. When the bosses are used as heat stake structures, heat is applied to the tips of the bosses. The heat deforms and enlarges the tips of the bosses so that the flex circuit 96 is retained. Flex circuit 96 may also be affixed to outer surface 94 using adhesive. With one suitable arrangement, flex circuit 96 is formed from adhesive-backed flex circuit material having multiple registration holes that mate with corresponding registration bosses on button guide structure 64. At least one of the registration bosses may be heat treated to help secure flex circuit 96.

Figure 5:
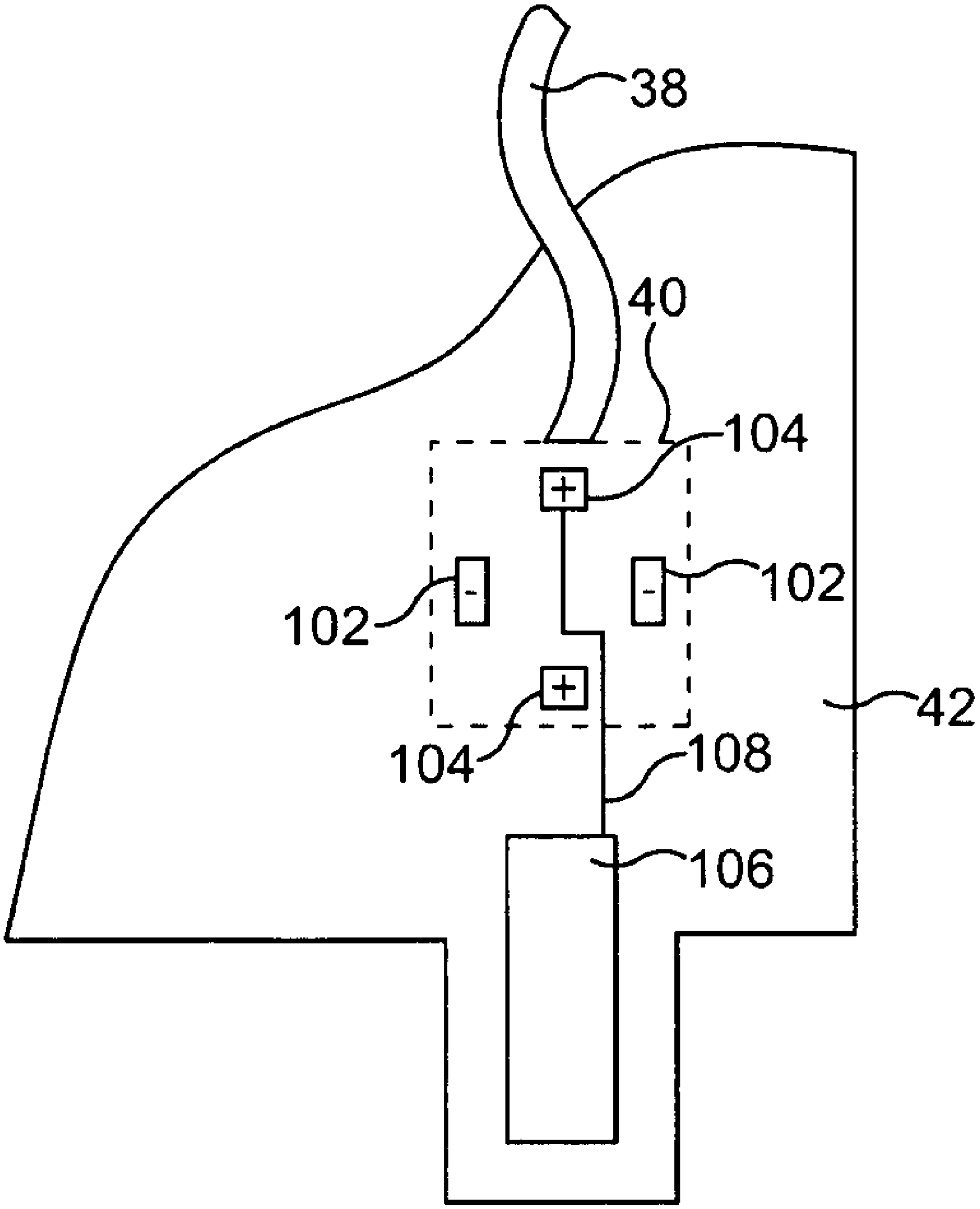
FIG. 5 is a top view of a portion of a printed circuit board in an antenna and button assembly in accordance with an embodiment of the present invention.

A top view of a portion of circuit board 42 in the vicinity of connector 40 is shown in FIG. 5. As shown in FIG. 5, connector 40 may be connected to coaxial cable 38. Connector 40 has positive terminals (sometimes called signal terminals) 104, which may be connected to pad 106 via conductive path 108. Ground terminals 102 may be connected to the ground plane of device 10 (e.g., via buried interconnects and ground plane structures in board 42).

Figure 6:
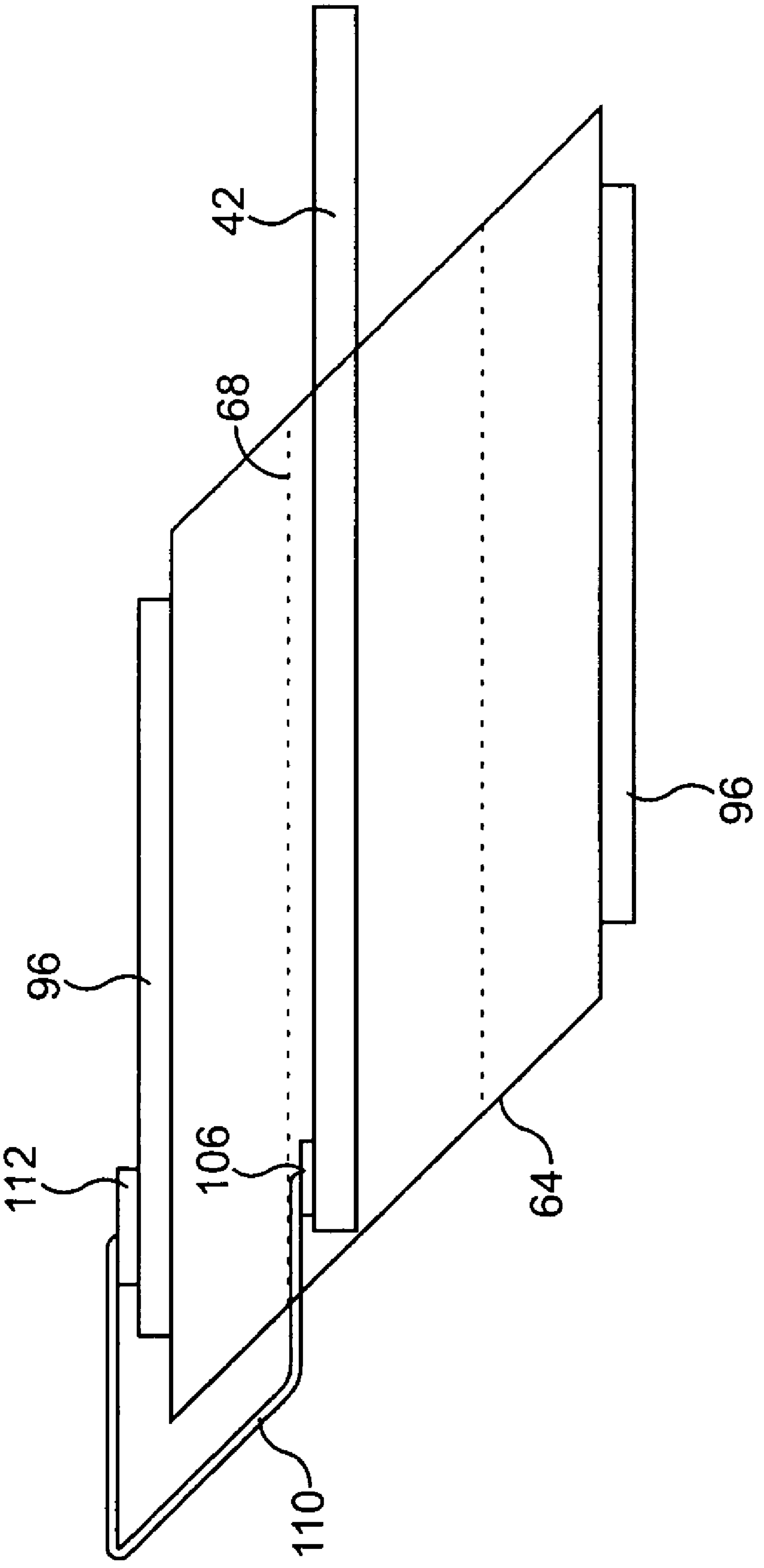
FIG. 6 is a cross-sectional side view of an illustrative antenna and button assembly showing how electrical contact for an antenna resonating element may be made using a spring conductor in accordance with an embodiment of the present invention.

Pad 106 may be electrically connected to antenna resonating element 60 by a spring or other suitable conductive path. A schematic cross-sectional view of button guide structure 64 that shows how spring 110 may be used to interconnect pad 106 on circuit board 42 with contact pad 112 on flex circuit 96 is shown in FIG. 6. Contact pad 112 may be electrically connected to antenna resonating element 60. With one suitable arrangement, antenna resonating element 60 is formed of copper and is coated with a sealing cap formed of solder mask material. The sealing cap can help to protect the copper of the antenna resonating element 60 from oxidation. A hole may be formed in the sealing cap to allow a gold plating to be formed for pad 112. Clip 110 may press against pad 112, as shown schematically in FIG. 6. If desired, clip 110 can be wrapped tightly around the exterior of button guide structure 64 to help hold flex circuit 96 in place against button guide structure 64. A heat stake boss may be used to help secure clip 110 to button guide structure 64.

Figure 7:
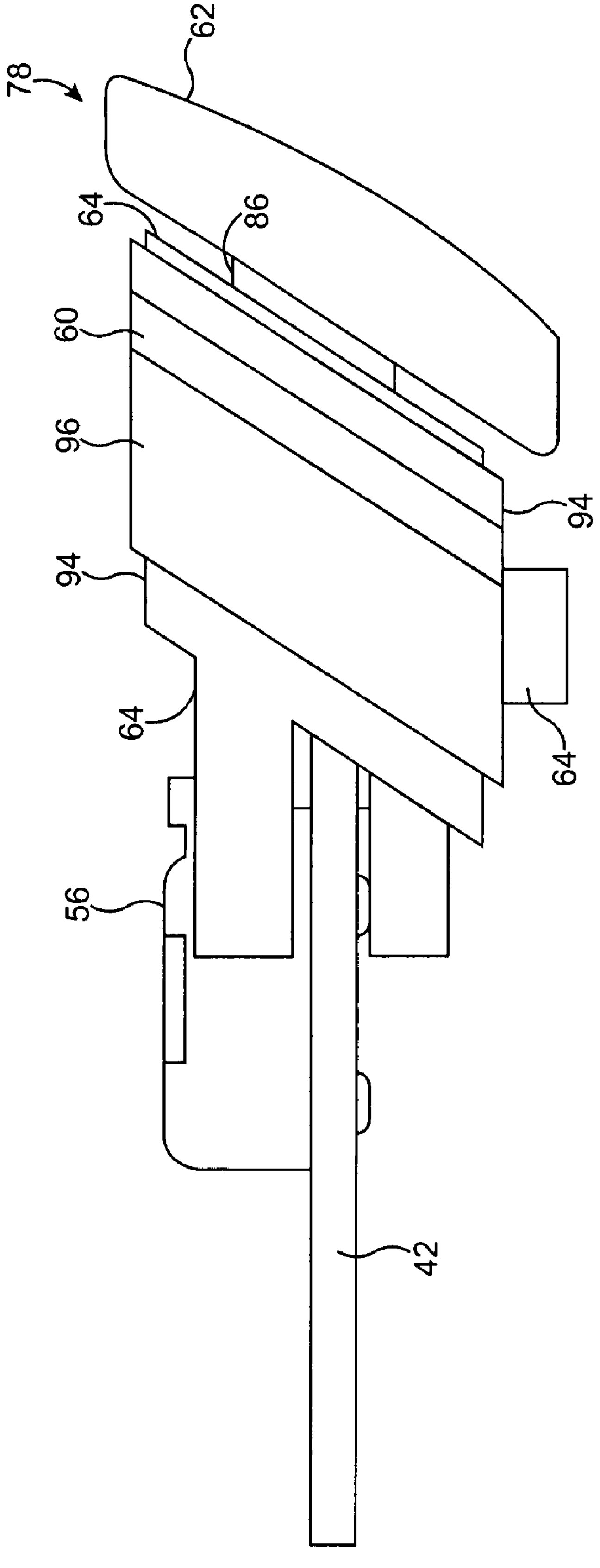
FIG. 7 is a side view of an antenna and button assembly in accordance with an embodiment of the present invention.
Figure 8:
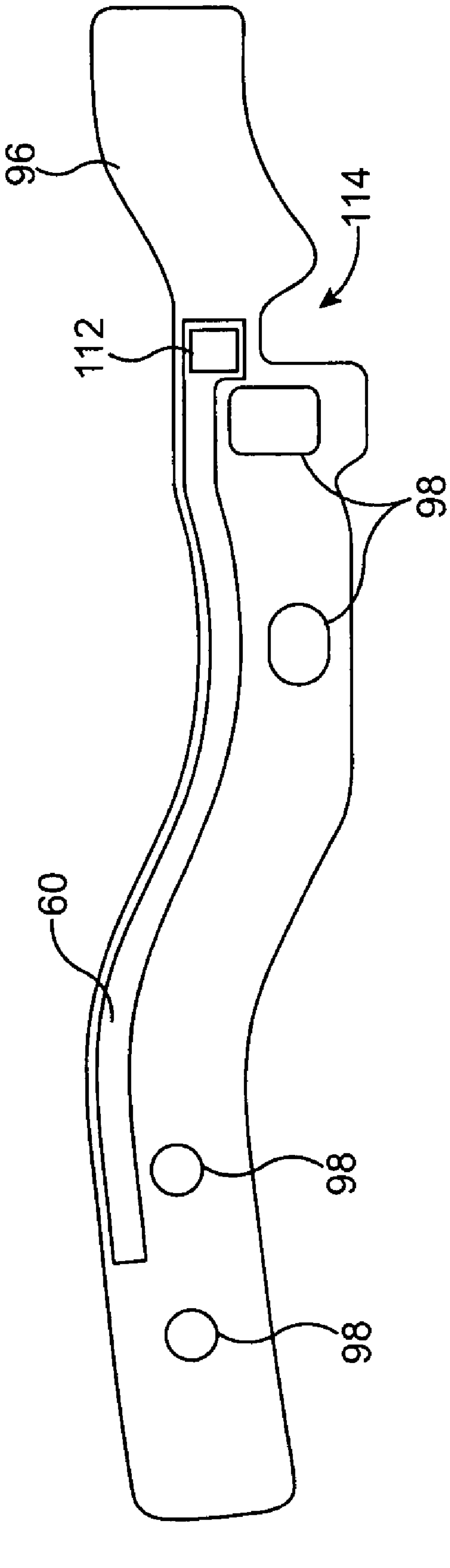
FIG. 8 is a top view of an illustrative flex circuit that includes a patterned antenna resonating element in accordance with an embodiment of the present invention.

A side view of button 30 after circuit board 42 has been attached to button guide structure 64 is shown in FIG. 7. As shown in FIG. 7, even though button guide structure 64 has a slanted shape (in this example), antenna resonating element 60 is able to conform to the shape of button guide structure 64 when flex circuit 96 is wrapped around button guide structure. FIG. 8 shows a suitable shape that may be used for flex circuit 96 when it is desired to wrap flex circuit 96 around a slanted button guide structure of the type shown in FIG. 7. In the illustrative arrangement of FIG. 8, flex circuit 96 has registration holes 98 that may mate with corresponding bosses on button guide structure 64. Notch 114 may be used to accommodate spring 110 of FIG. 6.

Figure 9:
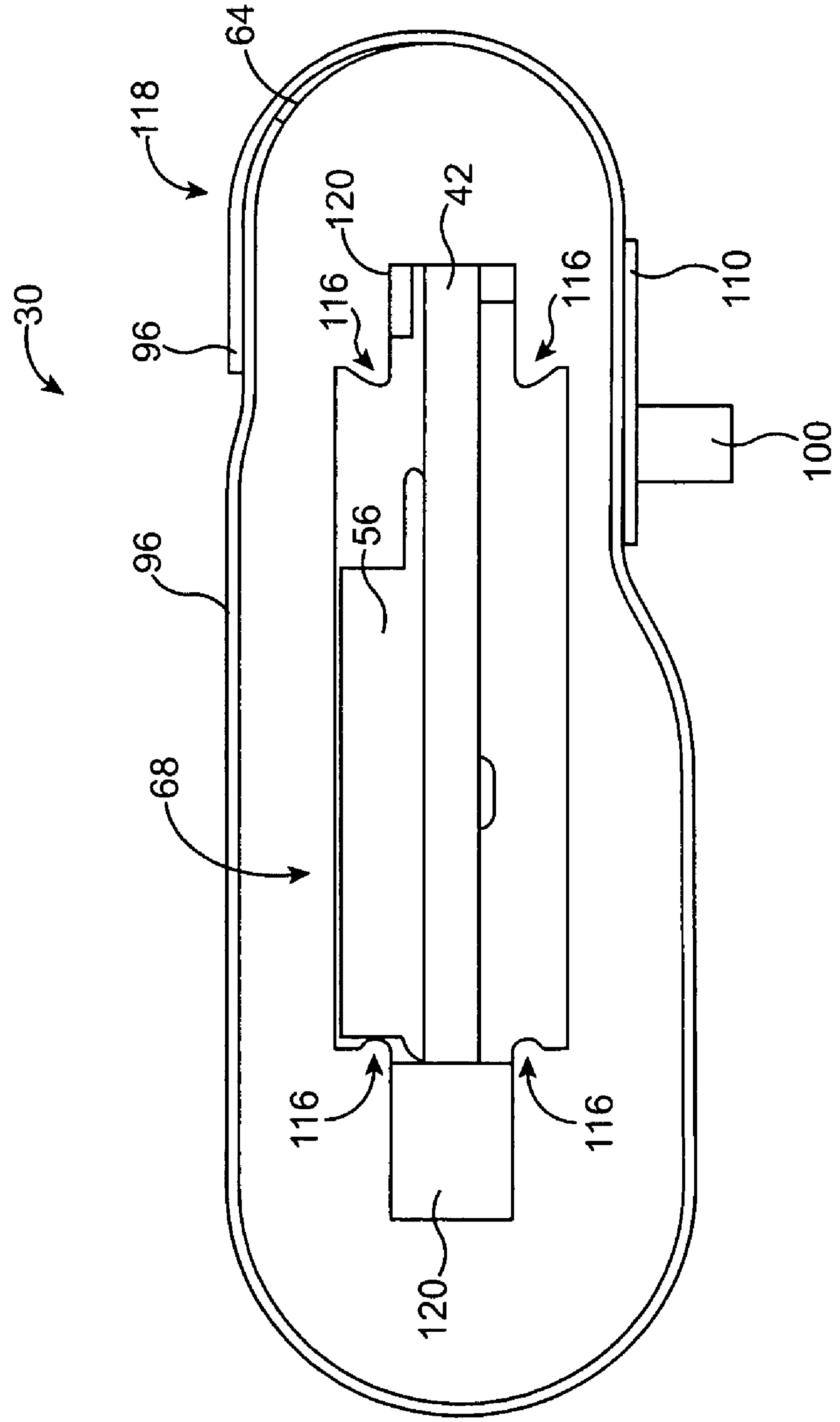
FIG. 9 is an end view of an illustrative antenna and button assembly showing how a flex circuit that includes an antenna resonating element may be wrapped around a button support in accordance with the present invention.

An end view of button 30 is shown in FIG. 9. As shown in FIG. 9, flex circuit 96 may be wrapped around button support structure 64 so that there is an overlap region 118. If desired, the length of flex circuit 96 may be adjusted so that there is no overlap or so that there is more or less overlap than shown in FIG. 9. Open portions 120 of guide structure 64 may be used to accommodate gussets 76 (FIG. 3) when switch actuation member 20 is moved in direction 88 towards switch 56 along axis 24.

Boss 100 may be a heat stake boss that has a rectangular cross-section so that boss 100 fits into rectangular hole 98 of FIG. 8. Spring 110 may have a rectangular hole that makes with the rectangular cross-section of boss 100. Boss 100 may be used to help secure clip 110 and flex circuit 96 to button guide structure 64.

Guide channel 68 of button guide support structure 64 may have guiding ribs such as ribs 116. Ribs 116 support and guide stem 86 of switch actuation member 20 as switch actuation member 20 and stem 86 reciprocate along axis 24. The use of four guiding ribs is merely illustrative. Any suitable number of ribs or other raised guiding structures may be used on the inner surfaces of channel 68 if desired. Moreover, ribs 116 may be provided on stem 86 in addition to or instead of ribs 116 on button guide structure 64.

If desired, buttons of other suitable shapes and sizes may be used. For example, switch actuation member 20 and corresponding guide channel 68 in button guide structure 64 may have circular cross sections, oval cross sections, square cross sections, triangular cross sections, etc. Switch actuation member head portion 70 may be slanted (as shown in the side view of FIG. 7) or may be oriented perpendicularly. Button guide structure 64, housing portion 12-2, and switch actuation member 20 may be provided using a different number of parts. For example, parts may be merged (e.g., by combining housing portion 12-2 and button guide structure), parts may be divided (e.g., by forming two or more parts in place of housing portion 12-2), etc. The button and antenna structures described in connection with FIGS. 1-9 are merely illustrative.

When a flex circuit is used, the strip of conductive material that makes up the antenna resonating element can be formed around the button guide structure by wrapping the flex circuit around the button guide structure and by securing the flex circuit and antenna strip using heat stakes, adhesive, or other suitable attachment mechanisms. If desired, alternative arrangements for forming the antenna on the button guide structure may be used.

For example, the button guide structure and antenna resonating element may be constructed using a double shot molding followed by a metal plating step. With this type of arrangement, the first shot of the double shot molding may form the majority of the button guide support structure 64. The second shot may create a recessed groove in the shape of antenna resonating element 60 (e.g., a strip antenna shape) on the surface of the button support structure. The main portion of the button support structure and the portion of the button support structure that creates the recessed groove may be formed from one or more polymers (e.g., polycarbonate, ABS plastic, combinations of polycarbonate and ABS plastic, etc.) or other suitable dielectric. With one suitable arrangement, polymers may be selected so that metal from the metal plating step will adhere only to the recessed groove, while the rest of the button support structure remains unplated. Following fabrication, the button support structure and its integrated metal-plated antenna resonating element have the appearance of structure 64 of FIG. 3.

As another example, antenna resonating element 60 may be formed by stamping antenna resonating element 60 from a conductive material such as a metal. Suitable metals that may be used include brass and copper (as examples). The stamped metal antenna resonating element may be formed around the button guide support structure 64 by insert molding the resonating element into a suitable dielectric (e.g., a polymer). The stamped metal antenna resonating element may also be formed around the button guide support structure by attaching the stamped antenna resonating element to button guide support structure 64 using adhesive, heat stakes, adhesive and heat stakes, or other suitable attachment mechanisms.

If desired, antenna resonating element 60 may be formed around button guide support structure 64 using vapor deposition or by printing a conductive ink or other coating onto button guide support structure.

The foregoing is merely illustrative of the principles of this invention and various modifications can be made by those skilled in the art without departing from the scope and spirit of the invention.

What is claimed is:

1. A wireless headset comprising:

an elongated metal housing portion having a longitudinal axis;

a microphone mounted in the metal housing portion;

a circuit board;

a switch attached to the circuit board;

a button guide structure that contains a guide channel;

a reciprocating member that is guided in the guide channel, that operates the switch, and that reciprocates along the longitudinal axis of the elongated metal housing portion; and an antenna resonating element that is formed around the button guide structure so that the antenna resonating element at least partially surrounds the reciprocating member and so that the antenna resonating element at least partially surrounds the longitudinal axis.

2. The wireless headset defined in claim 1 further comprising a dielectric housing portion that contains the button guide structure, wherein the dielectric housing portion is attached to the metal housing portion.

3. The wireless headset defined in claim 1 further comprising:

transceiver circuitry; and a coaxial cable connected between the transceiver circuitry and the antenna resonating element that conveys radio-frequency signals from the transceiver circuitry to the antenna resonating element, wherein the antenna resonating element comprise a flex circuit antenna resonating element that is attached to the button guide structure, wherein the reciprocating member comprises a stem, and wherein the flex circuit surrounds the stem.

4. The wireless headset defined in claim 1 further comprising a dielectric housing portion that contains the button guide structure.

5. The wireless headset defined in claim 1 further comprising a dielectric housing portion that is attached to the metal housing portion, wherein the dielectric housing portion has portions defining grooves, wherein the circuit board has edges, and wherein the edges of the circuit board are mounted within the grooves of the dielectric housing portion.

6. An antenna and button assembly, comprising:

an antenna resonating element comprising a flex circuit with a metal strip;

a button guide structure on which the flex circuit is mounted;

a switch; and a reciprocating switch actuation member that reciprocates along an axis while guided by the button guide structure, wherein the reciprocating switch actuation member operates the switch, wherein the metal strip is formed around the button guide structure so that the metal strip at least partially surrounds the reciprocating switch actuation member, and wherein the flex circuit is formed around the button guide structure so that there is at least some overlap between a first end of the flex circuit and a second end of the flex circuit.

7. The antenna and button assembly defined in claim 6 wherein the reciprocating switch actuation member comprises a stem with a rectangular cross-section, wherein the button guide structure comprises dielectric and has portions defining a hole with raised guiding structures, and wherein the raised guiding structures guide the stem as the reciprocating switch actuation member reciprocates along the axis.

8. The antenna and button assembly defined in claim 6 wherein the reciprocating switch actuation member comprises:

a stem; and a button head portion attached to the stem, wherein the button head portion comprises a portion formed of a first type of plastic and a portion formed of a second type of plastic, wherein the first type of plastic is different than the second type of plastic.

9. An antenna and button assembly, comprising:

an antenna resonating element comprising a flex circuit with a metal strip;

a button guide structure on which the flex circuit is mounted;

a switch; and a reciprocating switch actuation member that reciprocates along an axis while guided by the button guide structure, wherein the reciprocating switch actuation member operates the switch, wherein the metal strip is formed around the button guide structure so that the metal strip at least partially surrounds the reciprocating switch actuation member, and wherein the flex circuit comprises at least one registration hole and wherein the button guide structure comprises at least one registration boss.

10. The antenna and button assembly defined in claim 6 wherein the switch actuation member comprises a stem that reciprocates within the button guide structure, wherein the button guide structure comprises a plastic structure having a guide channel that guides the switch actuation member, wherein the button guide structure has an outer surface that surrounds the guide channel and the stem, and wherein the flex circuit is attached to the outer surface with adhesive.

11. Apparatus in a portable wireless device structure, comprising:

a switch;

a switch actuation member that operates the switch when pressed by a user;

a guide structure that guides the switch actuation member; and an antenna resonating element attached to the guide structure, wherein the guide structure comprises a plastic support structure, wherein the antenna resonating element comprises a metal strip contained within a flex circuit, wherein the flex circuit is wrapped around the plastic support structure so that the flex circuit at least partially surrounds the switch actuation member, wherein the metal strip is bent by wrapping the metal strip around the plastic support structure when the flex circuit is wrapped around the plastic support structure, and wherein the metal strip has a length and has at least one bend along its length that is in addition to any bend formed by wrapping the metal strip around the plastic support structure.

12. The apparatus defined in claim 11 wherein the switch actuation member comprises a stem and a button head portion mounted to the stem and wherein the stem reciprocates within a guide channel portion of the guide structure.

13. The apparatus defined in claim 11 wherein the flex circuit has at least one registration feature and wherein the plastic support structure has at least one boss that mates with the registration feature to align the flex circuit and the resonating element relative to the plastic support structure.

14. The apparatus defined in claim 11 wherein the flex circuit has a conductive pad that is electrically connected to the metal strip, the apparatus further comprising a spring that is connected to the conductive pad and that carries a radio-frequency signal to the antenna resonating element.

15. Apparatus in a portable wireless device structure, comprising:

a switch;

a switch actuation member that operates the switch when pressed by a user;

a guide structure that guides the switch actuation member; and an antenna resonating element attached to the guide structure, wherein the guide structure comprises a plastic support structure, wherein the antenna resonating element comprises a metal strip contained within a flex circuit, wherein the flex circuit is wrapped around the plastic support structure so that the flex circuit at least partially surrounds the switch actuation member, wherein, when the flex circuit is unwrapped from around the plastic support structure and the switch actuation member, the flex circuit has a curved edge along its length.

16. The apparatus defined in claim 15 wherein, when the flex circuit is unwrapped from around the plastic support structure and the switch actuation member, the metal strip has a curved edge along its length.

* * * * *